Dec. 27, 1966 R. HIRSCHBERG 3,294,483
PROCESS FOR RECOVERING PALLADIUM FROM ACID SOLUTIONS
Filed Oct. 2, 1964
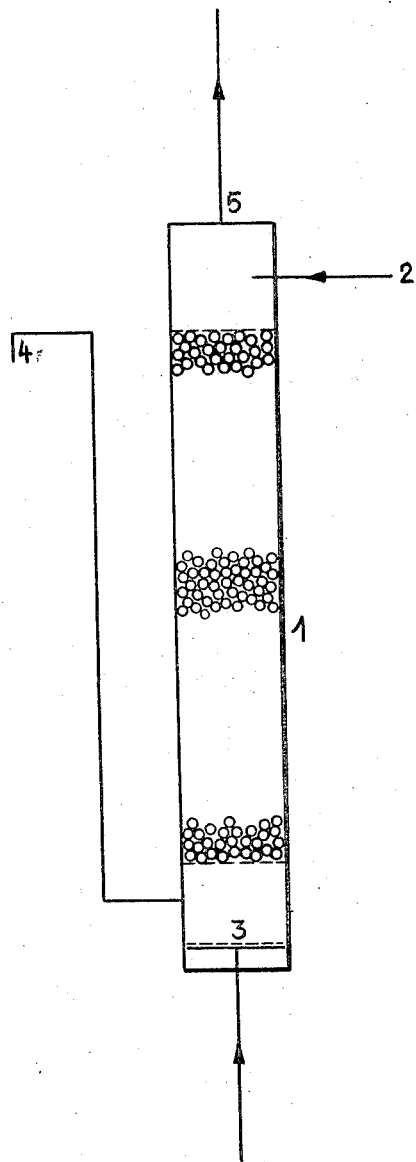
INVENTOR
RUDOLF HIRSCHBERG
BY
Curtis, Morris & Safford
ATTORNEYS

United States Patent Office 3,294,483
Patented Dec. 27, 1966

3,294,483
PROCESS FOR RECOVERING PALLADIUM FROM ACID SOLUTIONS
Rudolf Hirschberg, Bad Nenndorf, Germany, assignor to Farbwerke Hoechst Aktiengesellschaft vormals Meister Lucius & Brüning, Frankfurt am Main, Germany, a corporation of Germany
Filed Oct. 2, 1964, Ser. No. 401,055
Claims priority, application Germany, Oct. 4, 1963, F 40,911
5 Claims. (Cl. 23—87)

The present invention relates to a process for recovering palladium from acid solutions.

In various technical processes palladium-containing acid solutions are obtained, for example solutions containing palladium chloride dissolved in aqueous hydrochloric acid. In order not to lose, on the one hand, the expensive palladium and to enable, on the other hand, the use of the acids for other purposes where palladium, being a catalytically highly active metal may possibly be disturbing, it is necessary to eliminate and to recover as completely as possible the palladium from these solutions which with respect to the palladium contained in them, are in part very dilute.

Now we have found a process for recovering palladium from palladium-containing acid solutions in which the palladium-containing acid solutions are treated with gaseous hydrogen in the presence of palladinated carriers, the palladium separating on the palladinated carriers as a metal, and in which the palladium separated on the carriers is dissolved by treating it with an oxidizing acid or with a non-oxidizing acid and an oxidizng agent, and recovered in the form of a concentrated solution.

The process of the present invention is advantageously carried out by conducting the palladium-containing acid solution through a tower filled with palladinated packings into which hydrogen gas is introduced simultaneously and preferably in countercurrent-flow. The tower packings are preferably prepared from porous material having a rough surface by which the adhesion of the separated palladium is further improved. In order to facilitate the palladinization of the tower packings necessary for initiating the reaction, it has proved advantageous to impregnate the tower packings first with platinum. This platinization may be carried out, for example, by impregnating the porous tower packings with a solution of platinum chloride containing, for example, about 2 g. $PtCl_2$ per litre, and subsequently heating the packings to 800–1000° C. When hydrogen is bubbled through the tower filled with packings thus pretreated and an acid solution containing some dissolved palladium salt, an active deposit of palladium is very rapidly formed on the packings. More palladium is precipitated on this deposit from freshly supplied solutions by adding more hydrogen.

The platinization on the packings is not attacked, when the deposited palladium is dissolved after the palladium layer has attained the desired thickness. The amount of palladium which can be deposited on the packings depends on the working conditions, for example on the porosity and on the size of the packings, on the temperature and the throughput of liquid, and can be determined without difficulty by a preliminary test. The palladium must be dissolved when the tower packings are charged with palladium in an amount as determined by the preliminary test. The tower packings are treated for this purpose either with an oxidizing acid, for example with nitric acid, or with a nonoxidizing acid and an oxidizing agent. In the second case there may be used for example the following oxidizing agents: Chlorine, hydrogen peroxide, oxygen or air. The palladium is advantageously dissolved in a manner such that the reaction vessel, being preferably a packed tower, is filled with one of the acids cited above, after the supply of palladium-containing solution and of the hydrogen used for the separation has been stopped. The palladium is obtained in this manner in the form of a concentrated solution containing about 5–20 g. Pd per litre.

When carrying out the process of the present invention it was shown that the tower packings can be charged with palladium to about 10 g. Pd per litre of packings, without the strongly adhering layer separating from the packings.

All palladium-containing acid solutions, the acid component of which is nonoxidizing and, under the working conditions, resistant to hydrogen dissolved in palladium, for example hydrochloric or sulfuric acid, may be treated according to the process of the present invention.

The reactivation of the tower packings may be carried out for example by filling the tower with acid, for example with hydrochloric acid, without rinsing, after having dissolved the deposited palladium and after having discharged the concentrated palladum solution, a weakly palladium-containing acid being in the tower because of the residues of the concentrated palladium solution adhering to the tower packings. Subsequently, hydrogen is introduced until the palladium concentration in the acid is practically zero owing to the palladium separation on the platinized tower packings. The reaction vessel thus reactivated may be reinserted into the current of the palladium-containing acid and used for the separation of further palladium.

It was surprising to find that with the device described above palladium may also be eliminated from solutions containing free chlorine. When a chlorine and palladium-containing acid is introduced for example into the top of a tower filled with platinized packings and when hydrogen, preferably in a finely dispersed form, is simultaneously blown into the bottom of the tower, a palladium-free tower packing zone is formed at the top of the column in which chlorine is reduced by hydrogen to form hydrochloric acid owing to the catalytic action of the platinized tower packings. Then a zone follows where the actual separation of palladium from the solution now free of chlorine is taking place.

A particular advantage of the process according to the present invention consists in that it enables a practically quantitative separation and recovery of palladium by an economic method, and that the acid solution from which the palladium has been eliminated can be reused without being deleteriously affected.

The annexed drawing illustrates by way of example a mode of carrying out the process according to the present invention in counter-current flow.

Palladium-containing acid is continuously introduced at 2 into tower 1 filled with platinized packings and hydrogen is introduced at 3 by means of a gas distribution device. The acid introduced is discharged at 4 after having passed through a drawn up loop, so that the tower is always filled with acid. Hydrogen that is not consumed is discharged at 5. When, for example, the height of the packing layer in a tower having a diameter of 10 cm. is 80 cm. and when 200 l. of an aqueous palladium-containing hydrochloric acid containing 25% by weight HCl and 200 l. hydrogen are introduced into the tower per hour, the following results are obtained at a temperature of 60° C.:

| Solution introduced (mg. Pd/l.): | Solution discharged (mg. Pd/l.) |
|---|---|
| 180.0 | 3.77 |
| 15.4 | 0.19 |
| 0.9 | 0.024 |

I claim:
1. A process for recovering palladium as an inorganic chloride salt in a concentrated solution thereof, which comprises contacting an inorganic, acidic, palladium chloride salt solution with gaseous hydrogen and a porous packing material platinized by impregnation with a platinum chloride solution to reduce the salt to metallic palladium and deposit the palladium on said packing material as a metal and then recovering the palladium thus deposited by dissolving it with a member selected from the group consisting of an oxidizing acid and a combination of an oxidizing agent and a nonoxidizing acid to form a soluble salt of said acid.

2. A process as defined in claim 1, wherein the palladium chloride salt solution is contacted with the porous packing material by conducting it through a tower filled with said packing material countercurrently to hydrogen which is simultaneously introduced into the tower.

3. A process as defined in claim 1, wherein the palladium deposited on the porous packing material is dissolved with chlorine-containing hydrochloric acid.

4. A process as defined in claim 1 wherein the palladium deposited on the porous packing material is dissolved with nitric acid.

5. A process as defined in claim 4, wherein the step of contacting the palladium chloride salt solution with hydrogen and packing material is continued until the packing material contains about 10 g. palladium per liter.

References Cited by the Examiner

UNITED STATES PATENTS

| | | | |
|---|---|---|---|
| 1,430,449 | 9/1922 | Howard | 23—92 |
| 1,467,202 | 9/1923 | Slatineanu | 75—108 X |
| 1,752,936 | 4/1930 | Austin et al. | 23—92 X |
| 3,066,010 | 11/1962 | Horning et al. | 23—87 |
| 3,159,455 | 12/1964 | Skaperdas et al. | 23—216 |

FOREIGN PATENTS

| | | |
|---|---|---|
| 489,149 | 7/1938 | Great Britain. |
| 879,074 | 10/1961 | Great Britain. |

OTHER REFERENCES

Jacobson's "Encyclopedia of Chemical Reactions," volume 5, 1953 edition, pages 302, 303 and 311, Chapman & Hall, Ltd., London and New York.

MILTON WEISSMAN, *Primary Examiner.*

EDWARD STERN, OSCAR R. VERTIZ, *Examiners.*